Nov. 26, 1968    W. MÜHLRAD    3,412,473
PROCESS AND APPARATUS FOR COOLING GRANULAR MATERIAL
IN A VERTICAL SHAFT ARRANGEMENT
Filed Dec. 21, 1966    2 Sheets-Sheet 1
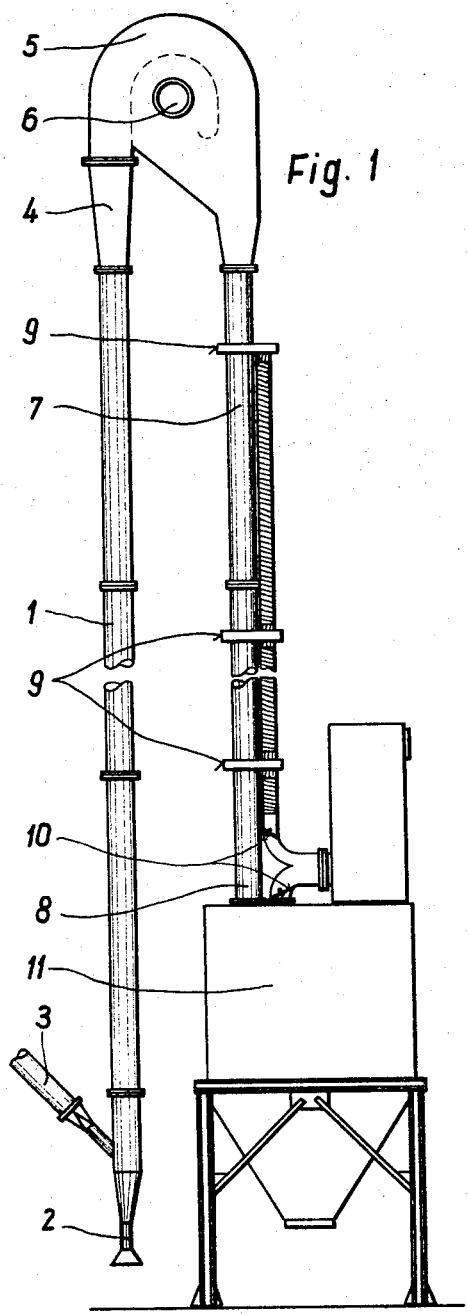
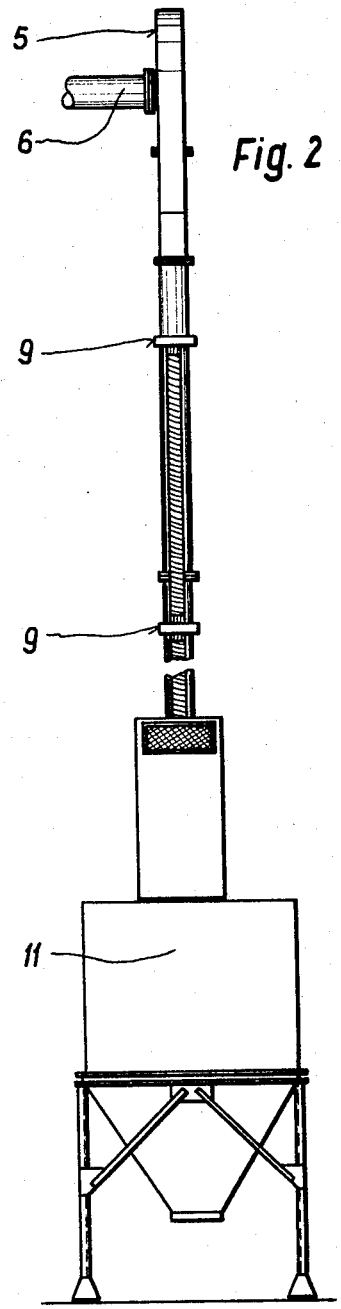
Inventor:
W. Mühlrad
By Richards & Geier
ATTORNEYS

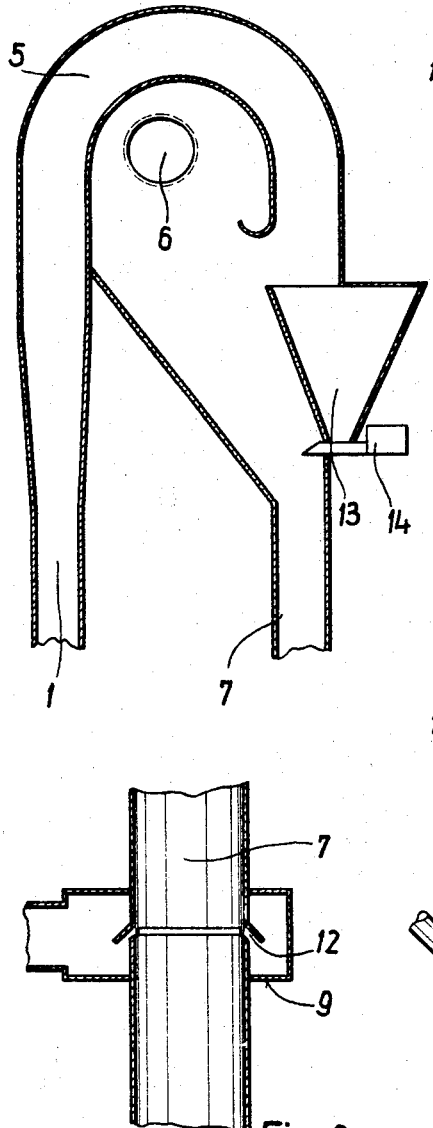
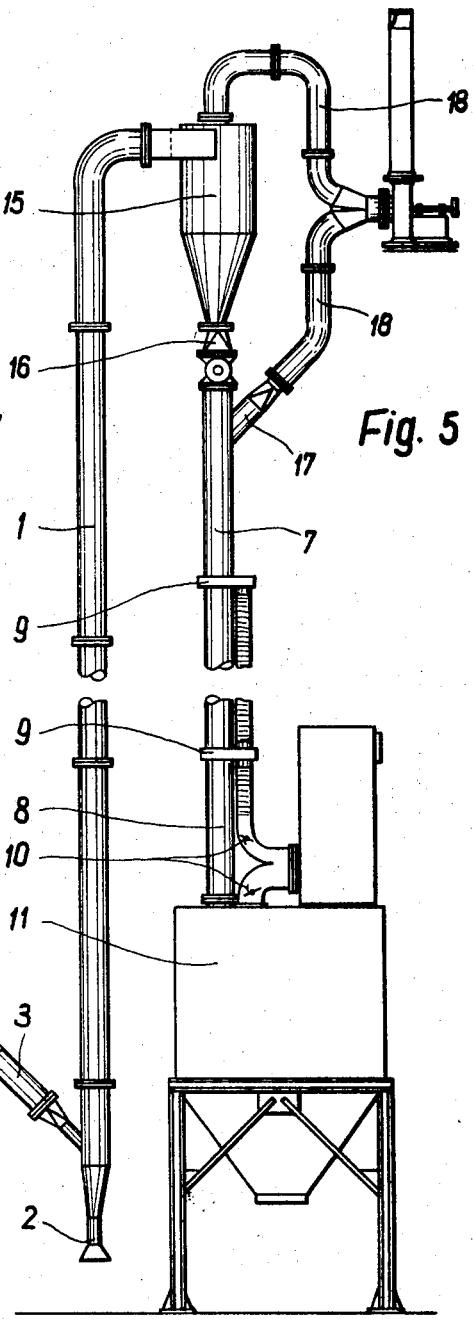

3,412,473
PROCESS AND APPARATUS FOR COOLING
GRANULAR MATERIAL IN A VERTICAL
SHAFT ARRANGEMENT
Wolf Mühlrad, Rueil-Malmaison, Hauts-de-Seine, France, assignor to Prat-Daniel S.A., Rueil-Malmaison, Hauts-de-Seine, France, a corporation of France
Filed Dec. 21, 1966, Ser. No. 603,615
Claims priority, application France, Dec. 23, 1965, 43,446
3 Claims. (Cl. 34—10)

ABSTRACT OF THE DISCLOSURE

Process and apparatus for cooling granular material, including fertilizers after they have been subjected to a drying treatment. The process consists of a preliminary cooling and a separate final cooling, the preliminary cooling being carried out preferably in a vertical shaft with cooling air and granular material both flowing upwardly through the shaft. The final cooling is carried out in a different vertical shaft with granular material moving downwardly and cooling air moving upwardly through that shaft. The two shafts are connected at the top by a diffusor and a separator, the granular material being transmitted by centrifugal forces to the second shaft. A container may be placed at the top of the second shaft to facilitate homogenization of the granular material. The cooling air of the final cooling continuously loosens the end layers of the material and may be used to remove some of the material. Air flowing through one shaft may be regulated or preliminarily treated independently from air in the other shaft. Separate spaced sprays of air may be injected into the air flowing through the second shaft.

---

This invention relates to a process and apparatus for cooling granular material.

In the chemical industry, particularly in fertilizer works, manufacturing plants are used for producing granular substances which at the end of the manufacturing process are subjected to drying and cooling treatments before they are placed in silos or in sacks for transportation.

The cooling step is absolutely essential in order to avoid any possible clotting of the granules which can be caused by different treatments depending upon the nature of the products.

For example, complex fertilizers with a phosphate base have the tendency to melt together when their temperature exceeds 60° C.–70° C.

In the case of ammonium nitrate a cooling from 80° C. to 25° C. is followed by a double change of crystals constituting an exothermic process characterized by a loss of a part of crystallization water which then causes a clotting of the grains unless water is removed as quickly as it is formed.

There is one general procedure which is the most common cause for the clotting of granular products which are placed in silos after drying but without cooling. As is known, granular products after leaving the drying furnace still contain steam in intermediate spaces the amount of which is often considered to be negligible. This steam is sufficient, however, after cooling and condensation to wet the outer surfaces of the individual grains which then form clots.

It is, therefore, essential to liberate the material from this steam and this is attained in the course of an effective cooling of the products.

In prior art the following three processes are primarily used to cool the products:

(1) Cooling in rotary drums through which air is circulated.

(2) Cooling of products arranged in layers capable of flowing. This capacity to flow is produced by flowing cooling air through a layer of spread out material, whereby the speed of air is limited to avoid any danger that the particles may fly up.

An apparatus used for this purpose often consists of two fluidised beds operating in series. The first one is supplied with ordinary air which makes it possible to bring the temperature of the products to an average of 25° C. to 30° C. above the surrounding temperature. Then the products reach the second bed which is supplied with air which has been cooled to 12° C.–15° C. and the relative humidity of which is below 25%–35%; in this manner it is possible to cool the products to 8° C.–10° C. above the surrounding temperature and to keep low the moisture absorbed by the products.

(3) Cooling of products in powder form in pneumatic transporting devices having the shape of vertical shafts with currents of air flowing upwardly through the shafts while the products to be cooled move in the same direction, so that both media move along a parallel path in a manner similar to that carried out in pneumatic drying devices.

The use of this process is limited to powdered materials the granules of which have a diameter of less than 0.5 mm., such as foundry sand, since in devices of this type the period of contact is too short to provide proper cooling of larger grains, particularly when the products have small heat conductivity.

The two last-mentioned processes are particularly suitable for the removal of intermediate steam and of moisture freed by crystalline changes.

An object of the present invention is to improve prior art processes and to provide a process which will combine the advantages of the previously described processes by making it possible to carry them out in a more simple and more economical manner.

Another object is the provision of a process of the described type which will make it possible to treat products the size of granules of which is between 1 mm. and 8 mm.

Yet another object is the provision of a process of the described type which employs simple means to improve the circulation of the cooling air around the grains at each moment of the transporting movement, as compared to prior art, the circulation being varied and made more uniform in the manner of a transported flow bed or whirl bed.

Other objects of the present invention will become apparent in the course of the following specification.

In the accomplishment of the objectives of the present invention it was found desirable to carry out the cooling in two phases. In the first phase the products are transported in a vertical shaft through which the mixture of air and grains flows upwardly. The speed of flow of air in that shaft must be somewhat greater than the free dropping speed of the largest grains contained in the product and it amounts substantially to 16–20 m./sec. for grains having a diameter of 4–5 mm. and a specific weight of 1.5 kg./liter.

The grains are partly cooled in this parallel flow apparatus, the cooling being limited on the one hand by a comparatively short period of contact and on the other hand by the difference in temperature between the outer surfaces of the grains and the transporting air, the temperature difference becoming smaller the closer is the upper end of the shaft, where the suspension reaches a condition approaching thermal equality.

Then air is removed from the granular product and is sucked away to the outside by a suction blower.

Thereupon the product being cooled is separated by centrifugal force action while the flow of air is exhausted outside the system by a fan and is taken to the second cooling phase in a vertical shaft wherein the product and the cooling air move in opposite directions. The product drops downwardly by its own weight while air flows upwardly through the shaft and is then sucked off by a suction blower which can be different from the above-mentioned suction blower or can be the same one. The rising speed of air in this shaft is somewhat smaller than the free dropping speed of the smallest grains contained in the product. This final cooling is furthered by a much longer period of contact, since the dropping speed of the grains being cooled is very small, while the temperature difference between the grains and the air is better balanced. Furthermore, since the amount of air in this phase is much smaller than in the preliminary cooling, it is possible to use air which has been previously conditioned as far as temperature and relative humidity are concerned and yet retain the economic advantages of the process, whereby the final cooling of the product is improved and at the same time the reappearance of humidity is prevented.

Furthermore, in the final cooling the cooling air current is preferably directed in such manner that it continuously loosens the end layer of the downwardly sinking grains, and guides this layer swirlingly back into the core flow.

The invention will appear more clearly from the following detailed description when taken in connection with the accompanying drawings, showing diagrammatically and by way of example, preferred embodiments of the inventive idea.

In the drawings:

FIGURE 1 is a front view of a cooler constructed in accordance with the present invention.

FIGURE 2 is a side view of the cooler shown in FIG. 1.

FIGURE 3 is an enlarged sectional view showing a detail of the construction.

FIGURE 4 is a partial section illustrating a somewhat different construction.

FIGURE 5 is a side view of a differently constructed cooler.

Throughout the drawings, similar parts are indicated by the same numerals.

The cooler shown in FIGS. 1 to 3 includes a vertical shaft 1 provided at its lower part with a converging-diverging nozzle 2 used for the introduction of cooling air, and also with a chute 3 for introducing the material to be treated. The upper part of the shaft 1 ends in widened portion 4 which is followed by a granule separator; in the example illustrated it has the shape of a tubular elbow 5.

Air used for the preliminary cooling is sucked out through the opening 6, while the grains are guided into the shaft 7 wherein the second cooling phase, namely, the final cooling, takes place. The shaft 7 receives air through its lower end 8 and also through a number of nozzles 9 provided in its walls.

Regulating valves 10 are used for the distribution of this air in the air flowing devices.

This air after use for the final cooling, is sucked out through the opening 6 along with the air used for the preliminary cooling or exhausted by a second fan. The cooled products drop into the supply silo 11, or they can be transported by the usual transporting means to a silo or to a sack-filling device in a different location of the works.

The converging-diverging nozzle 2 has the purpose of providing by whirl formation a floating condition of the granular product wherein the grains are uniformly distributed. It can be also used, however, to sort the product, since the speed at the mouth of this venturi nozzle can be so regulated that grains which are too heavy will go through, while the dropping of normal grains will be avoided.

The widened section 4 at the upper end of the shaft 1 has the purpose of slowing up the media and thus to make the contact period longer. Furthermore, this slowing up has the purpose of preventing the breaking up of grains in the separator 5 which could be caused by an intense contact with the walls of the separator. In addition, the striking action of the grains can be diminished by covering the inner walls with elastic substances such as rubber.

The nozzles 9 carried by the shaft 7 are shown in detail in FIG. 3. Air is introduced into the shaft through slots 12 with a higher speed than that with which air is blown into the shaft to produce local whirls and to prevent any accumulation of particles adjacent the walls of the shaft.

The use of these nozzles is an important feature of the present invention since it provides a homogenous suspension of particles in the shaft 7 and an effective utilization of cooling air. The number of nozzles and their distribution are selected according to the height of the shaft 7 and the desired end temperature.

On the other hand, this blowing into the shaft 7 of conditioned air divided throughout the height of the shaft makes it possible to limit any possible reabsorption of moisture by the product being cooled, since in the lower section of the shaft the rising speed is continuously decreased and on the contrary, the dropping speed of grains becomes continuously greater, so that the period of contact in the zone in which the reabsorption of moisture could take place, is diminished.

The product to be cooled enters the apparatus through the chute 3 and remains in motion during its entire travel through the apparatus. This avoids the drawback that the grains might ball together. The product is directly sucked into a silo, so that substantial savings are achieved by elimination of mechanical transporting means. The cooling air entering the apparatus through the branched nozzle 2 is preferably free atmospheric air but, if desired, it can be pretreated either by filtering, if the products to be treated are particularly susceptible to being dirtied by impurities contained in ordinary air, or by conditioning the temperature and relative humidity of air.

The cooling air operating in the end shaft 7 is preferably conditioned in order, on the one hand, to provide better cooling of the product and, on the other hand, to prevent any reabsorption of moisture which is possible if the grains are hygroscopic, since the movement of the countercurrent holds the finally treated product in contact with air entering the apparatus.

The regulation of the amount, temperature and relative humidity of air used in the last section must be adapted to the quality of products being treated.

FIG. 4 illustrates a construction which is particularly suitable for the treatment of coarse grains or for the treatment of granules having poor heat conductivity. The time period during which these grains remain in the preliminary cooling shaft, is comparatively short, namely, less than 4 or 5 seconds, so that they are cooled only superficially. Inside the grains there is no equalization of the temperature with the cooling air.

Therefore, according to the present invention a uniform distribution of calories in the mass of grains is furthered prior to final cooling. For that purpose according to the embodiment of FIG. 4, a container 13 is placed into the apparatus behind the intermediate separator 5. The product remains a comparatively short time, namely, 10–20 seconds in this container, the time being so calculated that the entire mass of grains again assumes a uniform temperature. Only then the grains reach the shaft 7 for the final cooling by means of a mechanical dispensing device 14 and are subjected to the final countercurrent treatment.

FIG. 5 shows a construction which differs from that of FIG. 1 essentially by the structure of the intermediate separator. According to this embodiment the separation of the grains takes place by a cyclone 15. The separated grains are removed through a chute 16 and are again caused to float in the shaft 7. The final cooling takes place in the shaft 7 in the same manner as in the previously described embodiment, while air used for the final cooling is sucked out through the opening 17.

The two suction openings for the removal of air can be either connected to separate blowers or to a single blower. The air conveying conduits 18 are provided with regulating valves to secure at will any desired distribution of air in the two conduits.

The process of the present invention for the cooling of granular substances has the advantage that the apparatus used is very simple; the process can be easily adapted to the particular properties of the products being treated, as well as to the desired final temperature. The regulation proceeds on the one hand, from the weight ratio of the products and air and, on the other hand, from the amount and properties of the used conditioned air.

Energy consumed by the process of the present invention is smaller than in prior art processes, since the amount of air used for cooling is approximately the same as that used for the cooling by fluidised beds, while on the other hand, pressure loss in the apparatus of the present invention is considerably smaller, namely, under 100 mm. water column.

A further advantage of the process of the present invention resides in the elimination of all mechanical transportation means for the products. The products can be introduced into the apparatus by their own gravity from the outlet of the drying furnace or the sieve and at the end of the apparatus can be transmitted directly into the stock silo.

According to practical experience the shaft 7 can be always made shorter than the shaft 1 for the preliminary cooling and this difference in height suffices to provide the stock silo. The elimination of mechanical transportation means also saves electrical energy and, above all, the maintenance costs.

In addition, an important advantage of the process of the present invention is that the apparatus necessary to carry it out, requires a very small surface area, so that the construction costs are low.

The process of the present invention can provide in addition to the cooling, a pneumatic sieving of the grains, whereby the material is freed from particles which are too heavy and which are removed by the converging-diverging nozzle 2 when the material is being introduced, the material being also freed from particles which are too light by the countercurrent flow in the shaft 7 for the final cooling. In accordance with the present invention this is attained by making the speed of air in that shaft higher than the free drop speed of the particles to be removed. In such a construction it is necessary to provide an effective separator in front of the blower so as to keep the fine particles removed from the product.

While the process of the present invention has been described in its use for the cooling of fertilizers, it can be obviously adapted to all other granular substances, particularly since practical experience has shown that other granular substances can be more easily treated.

It is thus apparent that many variations and modifications can be made in the process and apparatus of the present invention without departing from the intent and scope of the present invention.

What is claimed is:

1. A process of cooling granular material, comprising, in combination, the steps of preliminarily cooling the granular material by causing it to flow along with and in the same direction as cooling air, subjecting the preliminarily cooled granular material to centrifugal force action and finally cooling the granular material by causing it to flow along with and in countercurrent to cooling air, said centrifugal force transferring the preliminarily cooled granular material to the final cooling, causing the cooling air of the final cooling to continuously loosen the end layer of the material and regulating the type and properties of the cooling air of the final cooling independently from the cooling air of the preliminary cooling, the cooling air of the final cooling rising upwardly and simultaneously carrying some of the material, and injecting sprays of air at a plurality of locations into the upwardly rising cooling air of the final cooling, at least some of said sprays having a greater speed than said upwardly rising cooling air.

2. An apparatus for cooling granular material, comprising in combination, a vertical shaft for the preliminary cooling of the granular material, a separate vertical shaft for the final cooling of the granular material, means introducing granular material at the bottom of the first-mentioned shaft, means introducing cooling air at the bottom of the first-mentioned shaft, means introducing cooling air at the bottom of the second-mentioned shaft and means interconnecting the tops of the two shafts, the last-mentioned means comprising a diffusor upon the top of the first-mentioned shaft and a centrifugal force separator upon the top of the second-mentioned shaft and communicating with said diffusor, said diffusor widening in the direction toward said separator.

3. An apparatus for cooling granular material in accordance with claim 2, wherein the last-mentioned means further comprise a container upon the top of the second-mentioned shaft for homogenizing the granular material after the preliminary cooling.

References Cited

UNITED STATES PATENTS

| | | | |
|---|---|---|---|
| 95,616 | 10/1869 | Stevens | 34—57 |
| 2,118,078 | 5/1938 | Flugel | 34—10 |
| 2,841,384 | 7/1958 | Petersen | 263—32 |

JOHN J. CAMBY, *Acting Primary Examiner.*